United States Patent [19]
Hisa

[11] Patent Number: 5,900,706
[45] Date of Patent: May 4, 1999

[54] MOTOR DRIVE CONTROL APPARATUS

[75] Inventor: Fumiya Hisa, Kanagawa, Japan

[73] Assignee: Fuji Xerox Co., Ltd., Japan

[21] Appl. No.: 09/014,661

[22] Filed: Jan. 28, 1998

[30] Foreign Application Priority Data

Jan. 29, 1997 [JP] Japan .................................. 9-015725

[51] Int. Cl.⁶ .................................................. H02K 23/16
[52] U.S. Cl. .......................... 318/437; 318/608; 318/798; 318/809
[58] Field of Search ................................. 318/437, 608, 318/798, 809

[56] References Cited

U.S. PATENT DOCUMENTS 5,631,517  5/1997  Kato et al. .......................... 318/437 X

FOREIGN PATENT DOCUMENTS

61-112580   5/1986   Japan .
61-261716   11/1986  Japan .
4-107520    4/1992   Japan .
5-30779     2/1993   Japan .

Primary Examiner—Karen Masih
Attorney, Agent, or Firm—Finnegan, Henderson, Farabow, Garrett & Dunner, L.L.P.

[57] ABSTRACT

A motor drive control apparatus has a number of revolution setting circuit, a driving circuit for driving a motor to rotate at a predetermined number of revolution based on a number of revolution command signal output from the number of revolution setting circuit, a number of revolution detecting circuit for detecting the number of revolution of the motor, a driving voltage adjusting circuit for adjusting a level of the driving voltage of the motor to be supplied to the driving circuit, a motor control circuit including a PLL control circuit for controlling the number of revolution of the motor so that the phase difference between the phase of the number of revolution command signal and the phase of the number of revolution detection signal becomes within a predetermined range of value, and a voltage control circuit for instructing the driving voltage adjusting circuit to adjust the driving voltage of the motor to be at a level in the vicinity of the PLL controllable minimum level. Accordingly, it is possible to drive the motor at a driving voltage in the vicinity of the PLL controllable minimum level.

6 Claims, 7 Drawing Sheets

MOTOR DRIVE CONTROL APPARATUS

BACKGROUND OF THE INVENTION

1. Field of the Invention

The present invention relates to a motor drive control apparatus and relates more particularly to a motor drive control apparatus suitable for use in a rotation polyhedral mirror drive control apparatus for an optical scanning apparatus utilized for a laser printer, a facsimile apparatus, a copying machine, a display apparatus, etc.

2. Description of the Related Art

In recent years, as environmental problems have been closed up, energy saving, ecology and recycling have come to be talked about as countermeasures for solving these problems. For this purpose, various kinds of regulations have been made at present. An optical scanning unit using such a rotation polyhedral mirror as a polygon mirror is not an exception in the discussion of such environmental problems, and various countermeasures have been made to the drive control of an optical deflector of this unit in relation to energy saving.

An optical deflector of the conventional optical scanning unit has problems of noise, a rise in temperature and the useful life of the optical deflector because a rotation polyhedral mirror is driven to rotate at a high speed. As one of countermeasures for solving these problems, there has been employed a system for stopping the rotation of a motor for driving the rotation polyhedral mirror, constituting the optical deflector, during a standby time of the optical scanning unit, not during a printing operation period thereof.

If non-contact dynamic pressure bearings are used for the bearings of a motor that drives the rotation polyhedral mirror to rotate, the bearings are brought into contact with each other when the number of revolution of the motor is decreased as at the time of stopping the rotation of the motor. Therefore, it is not so desirable to stop the rotation of the motor. Thus, there is employed a system for rotating the motor during a standby time of the optical scanning unit at a smaller number of revolution than the number of revolution at the time of the print operation. As detailed countermeasures for this, the number of the revolution of the motor is controlled to be low by dividing the frequency of an oscillation output of an oscillation circuit acting as a number of revolution command by a circuit inside the optical defector. Alternately, the motor is driven to rotate at a number of revolution which does not cause the dynamic pressure bearings to be brought into contact with each other by setting the driving voltage of the motor itself of the rotation polyhedral mirror at a lower level than the driving voltage during the printing operation, as described in the Japanese Patent Application Laid-open Publication No. 4-107520.

Further, the above-described system for stopping the rotation of the motor or for driving the motor at a low number of revolution during the standby time of the optical scanning unit has, on the other hand, a problem that the starting time of the motor becomes longer. As countermeasures for solving this problem, there has been proposed a technique for increasing the driving voltage of the motor at the motor starting time and then returning the voltage to the original or ordinary driving voltage after a lapse of a predetermined time, as described in the Japanese Patent Application Laid-open Publication No. 61-112580. There has also been proposed another technique for driving the motor at a maximum voltage of a driving power source at the time of starting the motor and then gradually lowering the voltage to a normal motor driving voltage after a pulse interval obtained by an optical synchronization detector for a deflected laser beam has become a predetermined period, as described in the Japanese Patent Application Laid-open Publication No. 61-261716.

However, when the system is employed in which the motor for driving the rotation polyhedral mirror to rotate as an optical deflector is rotated at a low driving voltage during the standby time of the optical scanning unit, a certain level of driving voltage is necessary in order to stably rotate the motor. For this purpose, the voltage needs to be set at a voltage slightly higher than the minimum driving voltage. Accordingly, although it is possible to drive the motor for driving the rotation polyhedral mirror to rotate at a lower driving voltage, this set voltage which is slightly higher than the minimum driving voltage means a waste of power.

Further, the rotation polyhedral mirrors have variations in their individual manufacturing precision. Therefore, if the driving voltage of the motor is set at a constant value, there is a possibility that some of the rotation polyhedral mirrors do not have a stable rotation.

Further, if the dynamic pressure bearings are used for the bearings of the motor as in the case of the optical deflector unit described in the Japanese Patent Application Laid-open Publication No. 4-107520, depending on the variations of the manufacturing precision of the rotation polyhedral mirrors, the bearings are always in contact with each other during the standby time so that the optical deflector may be damaged.

Further, according to the technique described in the Japanese Patent Application Laid-open Publication No. 61-261716, in the case of detecting the number of revolution of the motor by turning on a laser light source, it is at least necessary to keep the laser light source on during the detection operation of the number of revolution. This has a problem of lowering the life of the laser light source as compared with the case of carrying out the detection of the number of revolution of the motor without keeping the laser light source on.

Further, if the motor is driven to rotate at a low driving voltage which merely does not cause the bearings to be in contact with each other as shown in Japanese Patent Application Laid-open Publication No. 4-107520, there is a problem that a PLL (Phase Locked Loop) control can not be applied for the number of revolution control and thus it is difficult to detect the normal or steady rotation mode.

Furthermore, when there is a large manufacturing error in the rotation polyhedral mirrors as the optical deflectors due to the variations of their manufacturing precision, the rotation of the rotation polyhedral mirrors becomes unstable and thus the number of revolution becomes unstable. Therefore, it becomes difficult to detect the number of revolution in this case. Also, the number of revolution can not be detected if, for example, a galling is caused in the bearings for some reason, which may result in a damaging of the optical deflector.

SUMMARY OF THE INVENTION

The present invention has been made in the light of the above-described situation, and it is a first object of the present invention to provide a motor drive control apparatus which can drive a motor at a driving voltage in the vicinity of a minimum level at which the PLL control can be carried out.

It is a second object of the present invention to provide a motor drive control apparatus which can drive a motor in a driving current in the vicinity of a minimum level at which the PLL control can be carried out.

In order to achieve the first object of the present invention, according to a first aspect of the present invention, there is provided a motor drive control apparatus, comprising: a number of revolution setting unit for outputting a number of revolution command signal for setting a number of revolution of the motor; a driving means for driving a motor to rotate at a predetermined number of revolution based on the number of revolution command signal output from the number of revolution setting means; a number of revolution detecting unit for detecting a number of revolution of the motor; a driving voltage adjusting means for adjusting a level of a driving voltage of the motor supplied to the driving means; a PLL control means for comparing a phase of a number of revolution command signal output from the number of revolution setting unit with a phase of a number of revolution detection signal output from the number of revolution detecting means and for controlling the number of revolution of the motor so that the difference between both the phases falls within a predetermined range of value; and a voltage control means for instructing the driving voltage adjusting means to adjust the driving voltage of the motor at a value in the vicinity of a minimum level at which the PLL control can be carried out.

Further, according to a second aspect of the present invention, in the motor drive control apparatus of the above-described first aspect of the present invention, the voltage control means is so structured to instruct the driving voltage adjusting means that the driving voltage of the motor is increased at the time of starting the rotation of the motor, that the driving voltage is reduced at a point of time when the difference between the phase of a number of revolution command signal output from the number of revolution setting means and the phase of a number of revolution detection signal output from the number of revolution detecting means has fallen within the predetermined range of value, that the driving voltage is increased gradually at a point of time when the difference between the phase of a number of revolution command signal output from the number of revolution setting means and the phase of a number of revolution detection signal output from the number of revolution detecting means has exceeded the predetermined range of value and a phase locked state has been canceled, and that the level of the driving voltage is maintained at a point of time when the difference between both the phases has fallen within the predetermined range of value again and the phases have been in a locked state.

Further, according to a third aspect of the present invention, in the motor drive control apparatus of the above-described first aspect of the present invention, the voltage control means is so structured to instruct the driving voltage adjusting means such that, at the time when the motor shifts its operation from the normal or steady operation mode to a predetermined low-speed operation mode, the driving voltage of the motor is reduced from the normal operation mode at a point of time when the number of revolution of the motor has reached a preset number of revolution of the predetermined low-speed operation mode, the driving voltage is increased gradually at a point of time when the difference between the phase of the number of revolution command signal output from the number of revolution setting means and the phase of the number of revolution detection signal output from the number of revolution detecting means has exceeded the predetermined range of value and the phase locked state has been canceled, and the level of the driving voltage is maintained at a point of time when the difference between both the phases has fallen within the predetermined range of value and the phases have been in the locked state.

According to the motor drive control apparatus having the above-described structure, the number of revolution setting means outputs the number of revolution command signal for setting the number of revolution of the motor, and the driving means drives the motor to rotate at the predetermined number of revolution based on the number of revolution command signal output from the number of revolution setting means.

Further, the number of revolution detecting means detects the number of revolution of the motor, and the driving voltage adjusting means adjusts the level of the motor driving voltage supplied to the driving means. Further, the PLL control means compares the phase of the number of revolution command signal output from the number of revolution setting means with the phase of the number of revolution detection signal output from the number of revolution detecting means and controls the number of revolution of the motor so that the difference between both the phases falls within the predetermined range of value. The voltage control means instructs the driving voltage adjusting means to adjust the driving voltage of the motor at a value in the vicinity of the minimum level at which the PLL control can be carried out.

According to the first to third aspects of the present invention, it becomes possible to carry out a stable drive control of the motor for all operation modes in the vicinity of a controllable minimum driving voltage, so that it is possible to prevent a rotation failure due to variations of motors or an increase in power consumption.

In order to achieve the second object of the present invention, according to a fourth aspect of the present invention, there is provided a motor drive control apparatus, comprising: a number of revolution setting unit for outputting a number of revolution command signal for setting a number of revolution of a motor; a driving means for driving the motor to rotate at a predetermined number of revolution based on the number of revolution command signal output from the number of revolution setting means; a number of revolution detecting means for detecting the number of revolution of the motor; a driving current adjusting means for adjusting a level of a driving current of the motor supplied to the driving means; a PLL control means for comparing a phase of a number of revolution command signal output from the number of revolution setting means with a phase of a number of revolution detection signal output from the number of revolution detecting means and for controlling the number of revolution of the motor so that the difference between both the phases falls within a predetermined range of value; and a current control means for instructing the driving current adjusting means to adjust the driving current of the motor at a value in the vicinity of a minimum level at which a PLL control can be carried out.

Further, according to a fifth aspect of the present invention, in the motor drive control apparatus of the above-described fourth aspect of the present invention, the current control means is so structured to instruct the driving current adjusting means that the driving current of the motor is increased at the time of starting the motor, that the driving current is reduced at a point of time when the difference between the phase of the number of revolution command signal output from the number of revolution setting means and the phase of a number of revolution detection signal output from the number of revolution detecting means has fallen within the predetermined range of value, that the driving current is increased gradually at a point of time when the difference between the phase of the number of revolution command signal output from the number of revolution setting means and the phase of the number of revolution detection signal output from the number of revolution detecting means has exceeded the predetermined range of value and a phase locked state has been canceled, and that the level of the driving current is maintained at a point of time when the difference between both the phases has fallen within the predetermined range of value again and the phases have been in a locked state.

Further, according to a sixth aspect of the present invention, in the motor drive control apparatus of the above-described fourth aspect of the present invention, the current control means is so structured to instruct the driving current adjusting means that, at the time when the motor shifts its operation from a steady operation mode to a predetermined low-speed operation mode, the driving current of the motor is reduced from the steady operation mode at a point of time when the number of revolution of the motor has reached a preset number of revolution of the predetermined low-speed mode, that the driving current is increased gradually at a point of time when the difference between the phase of the number of revolution command signal output from the number of revolution setting means and the phase of a number of revolution detection signal output from the number of revolution detecting means has exceeded the predetermined range of value and a phase locked state has been canceled, and that the level of the driving current is maintained at a point of time when the difference between both the phases has fallen within the predetermined range of value and the phases have been in a locked state.

According to the motor drive control apparatus having the above-described structure, the number of revolution setting means outputs a number of revolution command signal for setting the number of revolution of the motor, and the driving means drives the motor to rotate at the predetermined number of revolution based on the number of revolution command signal output from the number of revolution setting means.

Further, the number of revolution detecting means detects the number of revolution of the motor, and the driving current adjusting means adjusts the level of the motor driving current supplied to the driving means. Further, the PLL control means compares the phase of the number of revolution command signal output from the number of revolution setting means with the phase of the number of revolution detection signal output from the number of revolution detecting means and controls the number of revolution of the motor so that the difference between both the phases falls within the predetermined range of value. The current control means instructs the driving current adjusting means to adjust the driving current of the motor at a value in the vicinity of the minimum level at which the PLL control can be carried out.

According to the fourth to sixth aspects of the present invention, it becomes possible to carry out a stable drive control of the motor in all operation modes in the vicinity of a controllable minimum driving current, so that it is possible to prevent a rotational failure due to variations of motors or an increase in power consumption.

Further, according to the first to sixth aspects of the present invention, since a required number of revolution of the motor is set within the PLL controllable range in controlling the drive of the motor, this number of revolution can bear sufficiently in actual use.

BRIEF DESCRIPTION OF THE DRAWINGS

FIG. 6 is an explanatory diagram for showing a schematic configuration of the optical scanning device relating to the embodiments of the present invention to be used for a laser printer or the like.

DETAILED DESCRIPTION OF THE PREFERRED EMBODIMENTS

Figure 6:
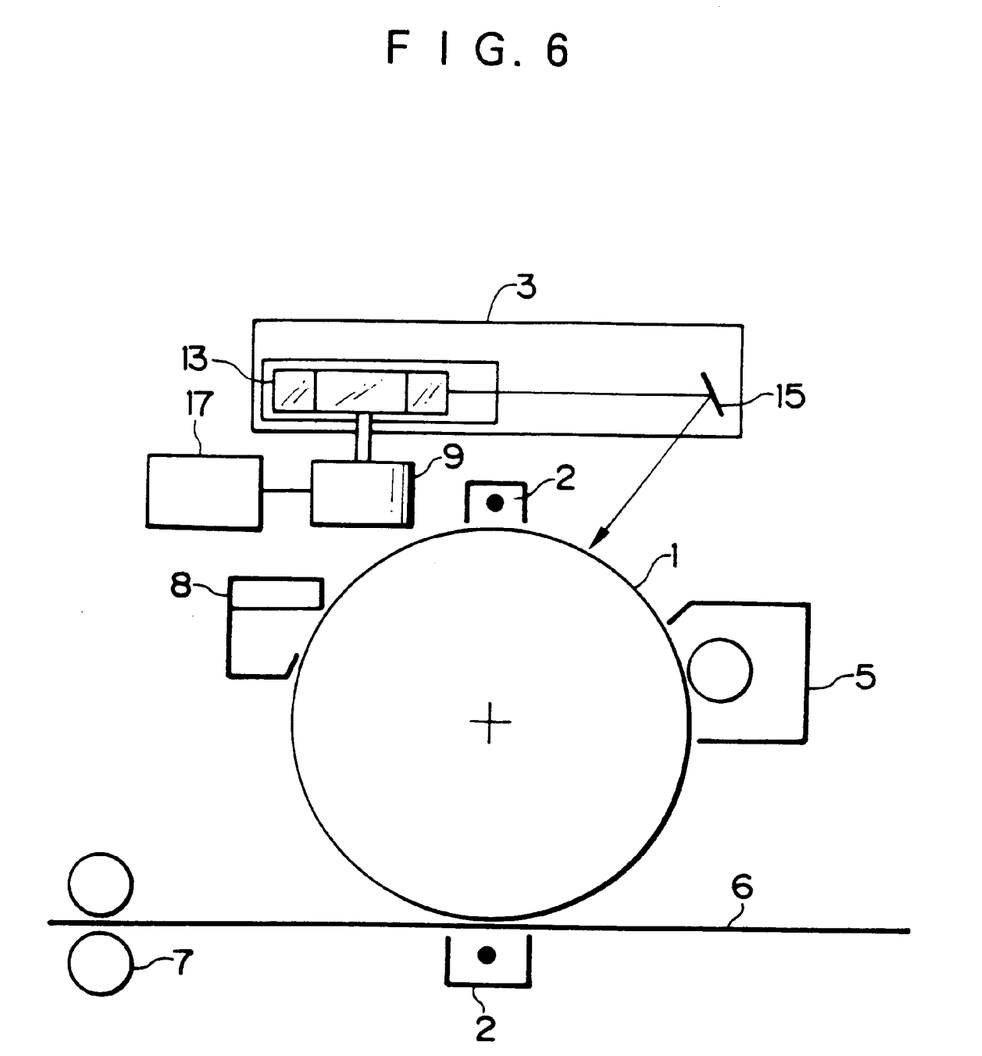

Embodiments of the present invention will be explained below with reference to the drawings. FIG. 6 shows a schematic configuration of an optical scanning apparatus to be used for a laser printer, a laser copying machine, etc. relating to the embodiment of the present invention. In FIG. 6, a photosensitive body 1 is charged by a charging device for transferring 2. The charged photosensitive body 1 has a characteristic that when it receives light, the potential of the light receiving portion of the charged photosensitive body 1 is lowered. By utilizing this characteristic of the photosensitive body 1, a laser beam is irradiated by a scanning optical device 3 onto a portion of the photosensitive body 1 where a toner is to be adhered. The scanning optical body 3 is structured to include a rotation polyhedral mirror 13 and a cylinder mirror 15. The rotation polyhedral mirror 13 is fixed to the axis of rotation of a motor 9, and the motor 9 is driven by a rotation polyhedral mirror drive control device 17.

Figure 7:
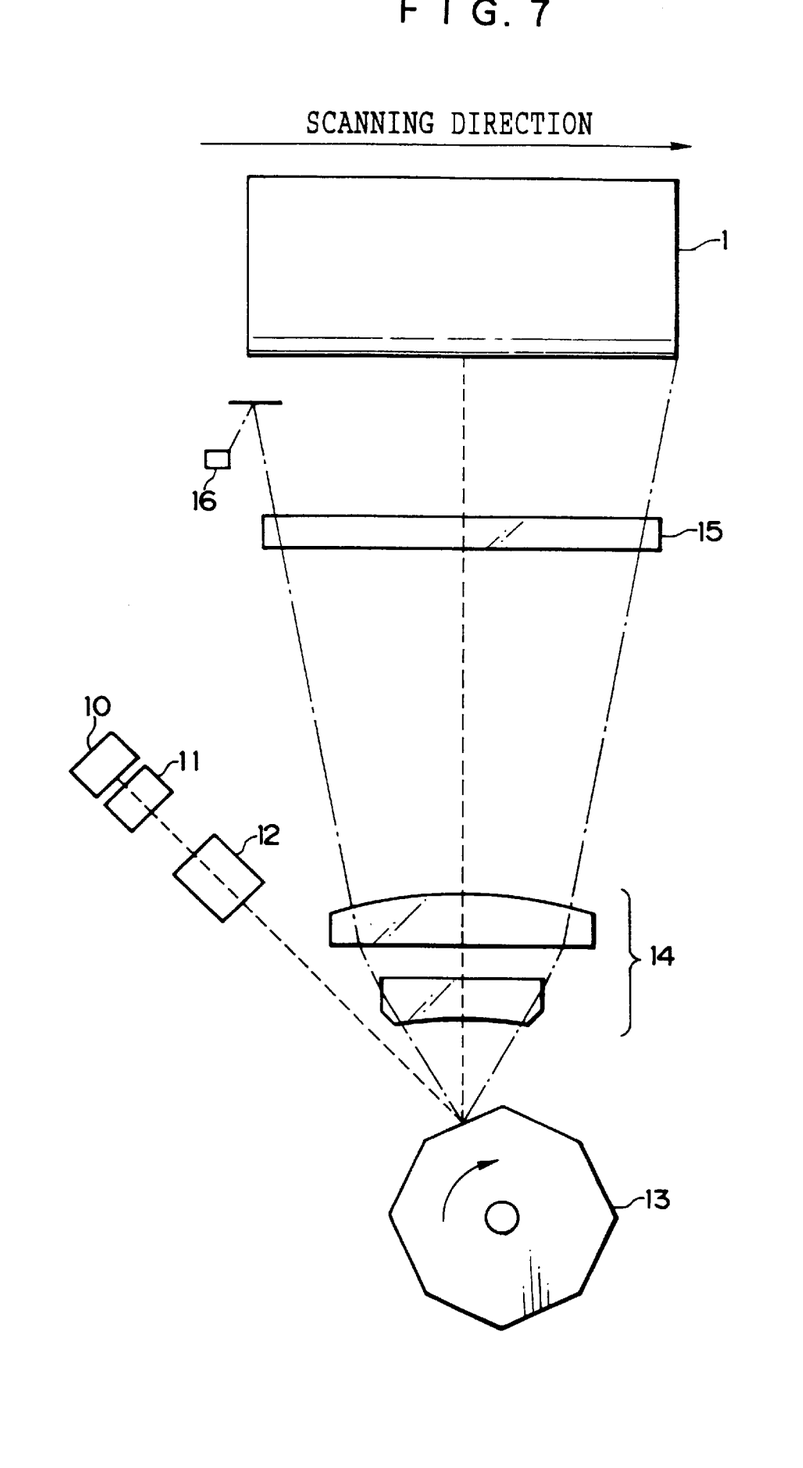
FIG. 7 is an explanatory diagram for showing a detailed configuration of the optical scanning apparatus in FIG. 6.

A detailed configuration of the scanning optical device 3 is shown in FIG. 7. Referring to this drawing, the scanning optical device 3 has a laser diode 10, a collimator lens 11, a cylinder lens 12, the rotation polyhedral mirror 13, a f·θ lens system 14, a cylinder mirror 15 and a synchronization sensor 16. A laser beam emitted from the laser diode 10 reaches the rotation polyhedral mirror 13 through the collimator lens 11 and the cylinder lens 12. The rotation polyhedral mirror 13 is a polygonal pillar body having a plurality of mirror surfaces or facets on the side surfaces and this is driven to rotate at a high speed by the motor 9. By the deflection function of the rotation polyhedral mirror 13, the laser beam obtains a reflection angle and scans on the photosensitive body 1 through the f·θ lens system 14 and the cylinder mirror 15.

When a laser beam is irradiated onto the surface of the photosensitive body 1 by the scanning optical device 3, a toner is adhered by a developer 5 to only a portion of this surface where the potential has changed. The toner is transferred to an image bearing member 6 such as a sheet of paper by the transfer charging device 2, and is then fused on the image bearing member 6 by a fixing device 7. The toner which remains on the surface of the photosensitive body 1 is removed by a cleaner 8, and thereafter the photosensitive body 1 is charged again and is exposed with a laser beam emitted from the scanning optical device 3.

Figure 1:
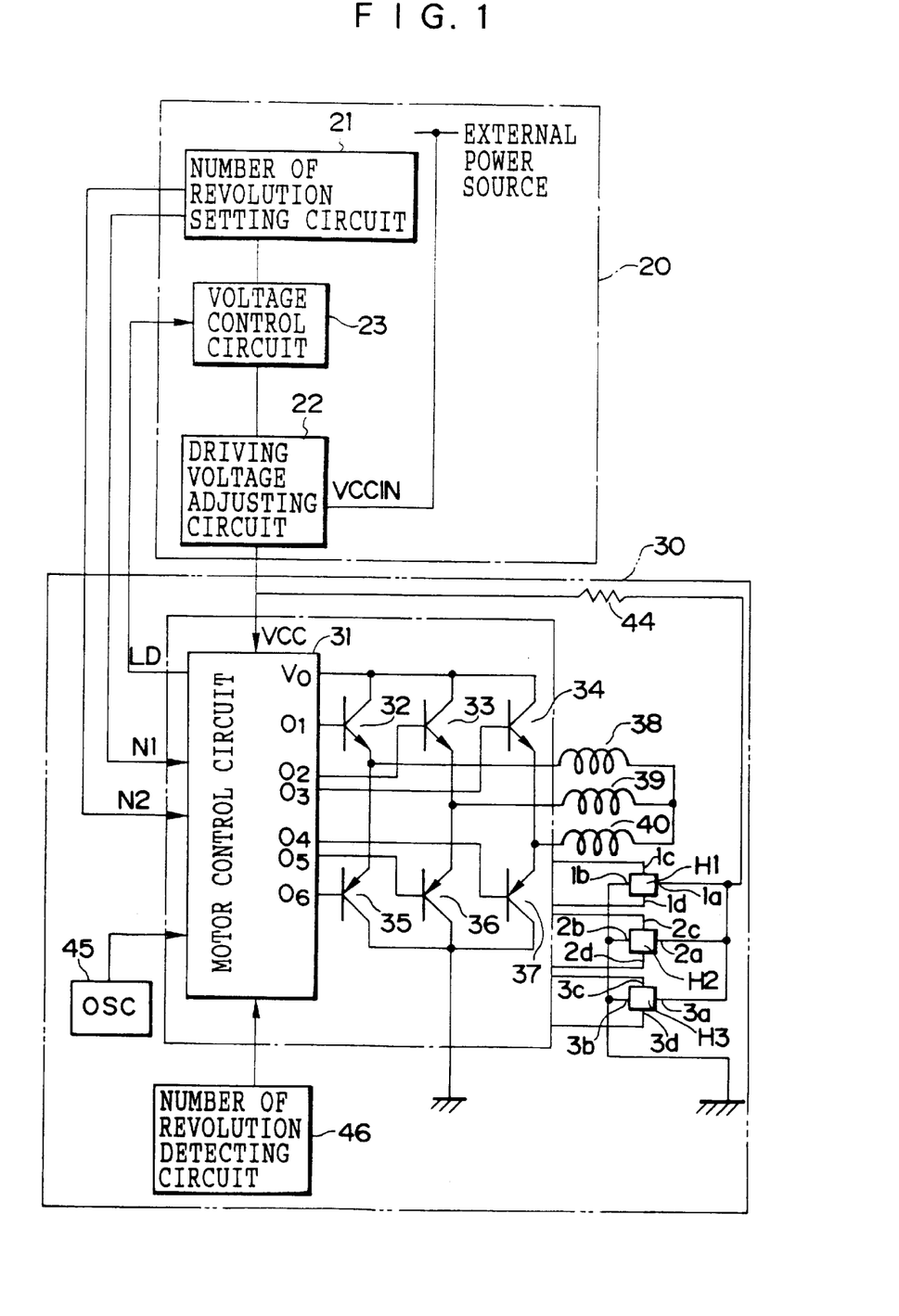
FIG. 1 is a block diagram for showing a configuration of a first embodiment of a rotation polyhedral mirror drive control apparatus for an optical scanning apparatus to which the present invention is applied.

FIG. 1 shows a configuration of the rotation polyhedral mirror drive control apparatus for an optical scanning apparatus relating to a first embodiment of the present invention. Referring to this drawing, the rotation polyhedral mirror drive control device has an external processing circuit section 20 for controlling a motor circuit section 30 and the motor circuit section 30 for directly contributing to the drive control of a driving motor that rotates the rotation polyhedral mirror of an optical deflector.

The external processing circuit section 20 has a number of revolution setting circuit 21, a driving voltage adjusting circuit 22 and a voltage control circuit 23. The number of revolution setting circuit 21 outputs a number of revolution command signal for setting a number of revolution of the motor. By the voltage control circuit 23, the number of revolution setting circuit 21 is set with a high number of revolution N1 at the time of starting the optical scanning apparatus or at the printing time, for example, and set with a low number of revolution N2 at a stand-by time or at the low-speed operation time such as at the image resolution change-over time.

The driving voltage adjusting circuit 22 adjusts the level of the motor driving voltage to be supplied to a motor control circuit 31 of the motor circuit section 30 under the control of the voltage control circuit 23.

According to the operation mode of the optical scanning apparatus, the voltage control circuit 23 instructs the number of revolution setting circuit 21 to change the set number of revolution so that the motor is driven to rotate at different number of revolutions between the normal or steady operation time such as at the printing time and the low-speed operation time such as at the stand-by time or the resolution change-over time, for example. At the same time, the voltage control circuit 23 instructs the driving voltage adjusting circuit 22 to adjust the motor driving voltage at a level in the vicinity of a PLL controllable minimum level based on the phase detection signal output from a PLL control device or means, to be described later, for showing whether the phase of the number of revolution detection signal for detecting the number of revolution of the driving motor is in a locked state or not.

The motor circuit section 30 has the motor control circuit 31, switching transistors 32, 33, 34, 35, 36 and 37 for controlling to which one of field coils 38, 39 and 40 of the motor a current is to be supplied, a crystal oscillator 45 for generating a number of revolution command signal, a number of revolution detecting circuit 46 for detecting the number of revolution of the motor, and Hall elements H1, H2 and H3 for detecting position information of the rotation angle of the motor rotor and like.

The motor control circuit 31 is structured to include a drive control section for controlling the current conduction of the field coils 38, 39 and 40 through the switching transistors 32, 33, 34, 35, 36 and 37, and the PLL control circuit.

The switching transistors 32, 33, 34, 35, 36 and 37 are three-phase bridge connected to structure a driving circuit, and AC output terminals of this circuit are connected to one end of the field coils 38, 39 and 40 respectively. The other ends of the field coils 38, 39 and 40 are connected in common. The commonly connected collectors of the switching transistors 32, 33 and 34 are connected to a terminal V0 of the motor control circuit 31, and the commonly connected collectors of the switching transistors 35, 36 and 37 are grounded. Further, the bases of the switching transistors 32, 33, 34, 35, 36 and 37 are connected to terminals 01 to 06 of the motor control circuit 31 respectively. The driving voltage of the motor is applied to the commonly connected collectors of the switching transistors 32, 33 and 34 from the terminal V0 of the motor control circuit 31.

The number of revolution detecting circuit 46 is structured to output a pulse signal of a frequency corresponding to the number of revolution by detecting a change of magnetism of a permanent magnet fixed to the motor, for example.

The Hall elements H1, H2 and H3 have their respective terminals 1a, 2a and 3a connected in common, and a power source voltage Vcc is applied to these terminals through a resistor 44. Terminals 1b, 2b and 3b are grounded by being connected in common. Thus, a current is always being supplied to each of the Hall elements H1, H2 and H3. When the rotor of the motor rotates, each of the Hall elements H1, H2 and H3 detects a magnetic flux of the permanent magnet fixed to the rotor, and outputs from each of output terminals 1c, 1d, 2c, 2d, 3c and 3d a voltage of a different polarity depending on whether the N pole or the S pole of the permanent magnet passes through the fitting position of each Hall element. The drive control section receives the output signals of the Hall elements H1, H2 and H3 as the position information of the rotor of the motor and uses this position information for generating a control signal to determine the order of the switching of the switching transistors 32, 33, 34, 35, 36 and 37.

Figure 2:
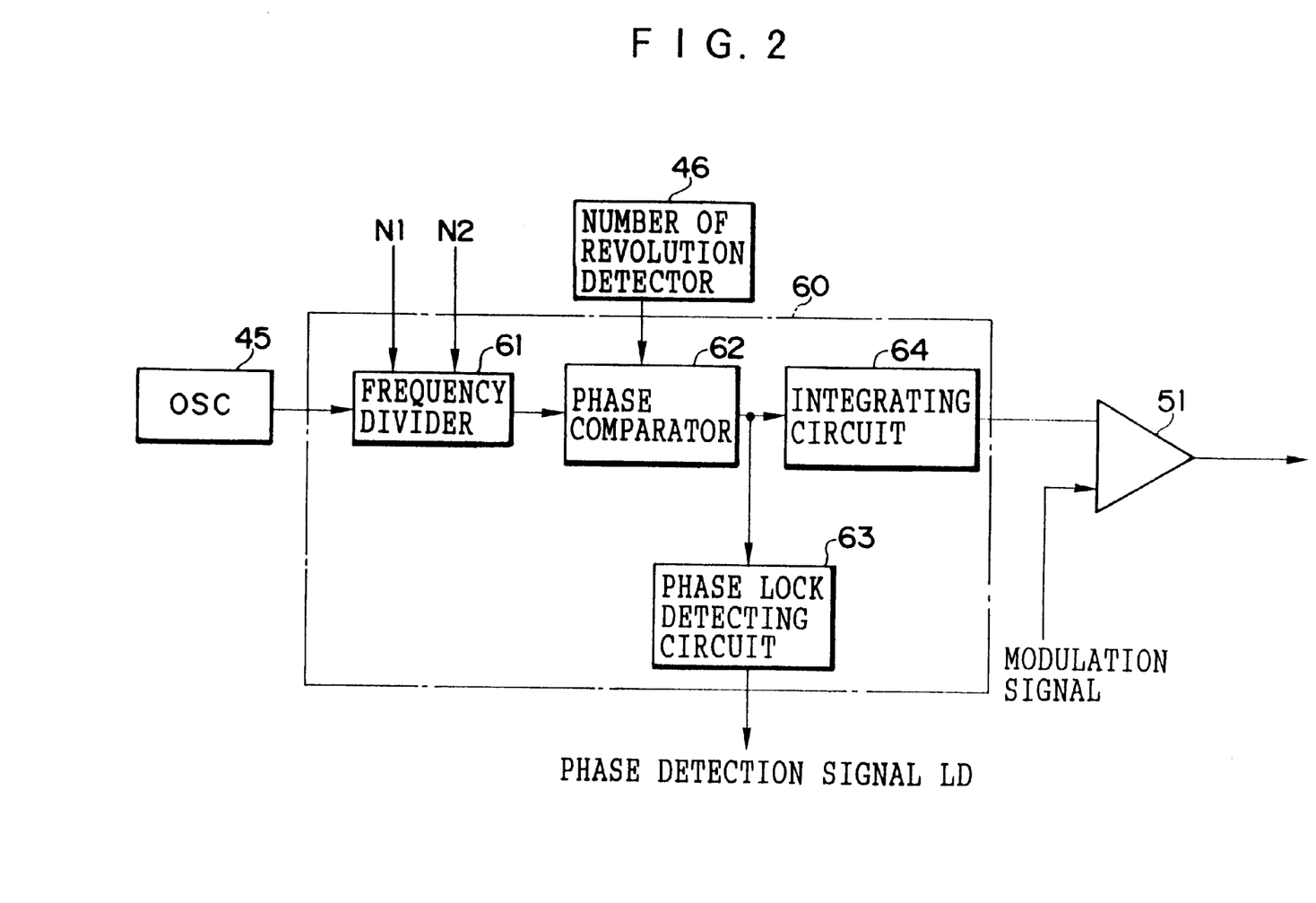
FIG. 2 is a block diagram for showing a schematic configuration of a PLL control circuit for the rotation polyhedral mirror drive control device shown in FIG. 1.

A schematic configuration of the PLL control circuit is shown in FIG. 2. Referring to FIG. 2, the PLL control circuit 60 has a frequency divider 61, a phase comparator 62, a phase lock detecting circuit 63 and an integrating circuit 64. A frequency dividing ratio is set to the frequency divider 61 based on a number of revolution command output from the number of revolution setting circuit 21, and the frequency divider 61 divides the frequency of an oscillation output from the crystal oscillator 45 according to the number of revolution command.

The phase comparator 62 compares the phase of a number of revolution command signal output from the frequency divider 61 with the phase of a number of revolution detection signal output from the number of revolution detecting circuit 46, and outputs a signal corresponding to the phase difference to the phase lock detecting circuit 63 and the integrating circuit 64.

The phase lock detecting circuit 63 outputs a phase detection signal LD for showing whether the phase of the number of revolution detection signal is in the locked state or not from the result of the comparison between the phase of the number of revolution command signal and the phase of the number of revolution detection signal output from the number of revolution detecting circuit 46.

The integrating circuit 64 integrates the output signals of the phase comparator 62 and uses the result of the integration for the generation of a switching control signal to be supplied to each base of the switching transistors 32, 33, 34, 35, 36 and 37. The output signal of the integrating circuit 64 is compared with a modulation signal of a triangular wave or the like by a comparator 51, and a PWM signal is generated. This PWM signal is supplied to each base of the switching transistors 32, 33, 34, 35, 36 and 37 from the terminals O1 to O6 of the motor control circuit 31 in a predetermined order based on the position information of the rotor of the driving motor obtained from the Hall elements H1, H2 and H3. As a result, a rotation magnetic field is generated in the magnetic field coils 38, 39 and 40, and the drive motor fitted with the rotation polyhedral mirror is driven to rotate.

Figure 3:
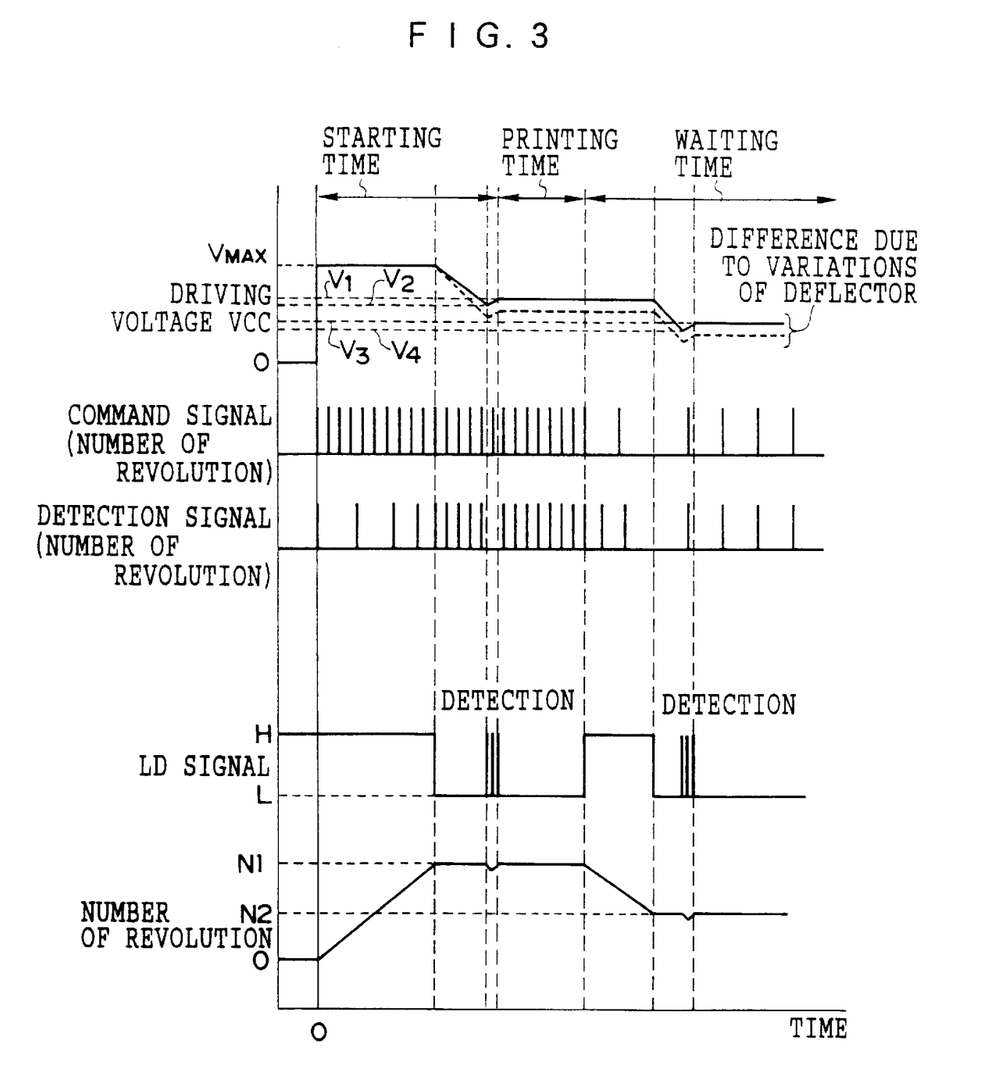
FIG. 3 is a time chart for explaining the operation of the rotation polyhedral mirror drive control device shown in FIG. 1.

The operation of the rotation polyhedral mirror drive control unit relating to the first embodiment of the present invention having the above-described structure will be explained next with reference to FIG. 3. At the time of starting the motor, the driving voltage adjusting circuit 22 supplies a voltage Vmax of a maximum level of a driving voltage Vcc to the motor control circuit 31 under the control of the voltage control circuit 23 in order to shorten the starting time of the motor. The motor control circuit 31 applies the voltage Vmax to the commonly connected collectors of the switching transistors 32, 33 and 34 from the terminal V0.

On the other hand, a high number of revolution N1 is set to the number of revolution setting circuit 21 based on an instruction signal of the voltage control circuit 23, and a number of revolution command is output from the number of revolution setting circuit 21 to the frequency divider 61 of the motor control circuit 31. By this number of revolution command, the frequency dividing ratio of the frequency divider 61 is set according to the number of revolution N1, and the frequency of the oscillation output of the crystal oscillator 45 is divided. The number of revolution command output from the frequency divider 61 is changed to a PWM signal through the phase comparator 62, the integrating circuit 64 and the comparator 51, and the PWM signal is supplied to each base of the switching transistors 32, 33, 34, 35, 36 and 37 from the terminals O1 to O6 of the motor control circuit 31 in a predetermined order based on the position information of the rotor of the motor obtained from the Hall elements H1, H2 and H3. As a result, the number of revolution of the motor increases, and the phase of the number of revolution command signal output from the frequency divider 61 and the phase of the number of revolution detection signal output from the number of revolution detecting circuit 46 are compared with each other by the phase comparator 62.

At a point of time when the phase difference has become within a predetermined range of value, that is, when the detected number of revolution of the motor has reached the number of revolution N1, the phase detection signal LD output from the phase lock detecting circuit 63 changes from a high level to a low level, and the phase of the number of revolution detection signal is locked by the PLL control circuit 60. At this time, the motor for driving the rotation polyhedral mirror of the optical deflector to rotate is set to a state of being controlled to rotate at a constant speed at the number of revolution N1 and at the driving voltage Vmax.

The voltage control circuit 23 receives the phase detection signal LD, and at a point of time when this signal has become a low level, the voltage control circuit 23 outputs an instruction signal for reducing the driving voltage Vcc to the driving voltage adjusting circuit 22. As a result, the driving voltage Vcc is reduced gradually from the Vmax level, and when the driving voltage Vcc has been reduced to the level where Vcc=V2, the motor becomes no more able to generate a torque for driving the rotation polyhedral mirror at the number of revolution N1, so that the phase locked state of the number of revolution detection signal is canceled and the PLL control can not be carried out. Accordingly, the number of revolution of the motor is lowered, the difference between the phase of the number of revolution command signal output from the frequency divider 61 and the phase of the number of revolution detection signal output from the number of revolution detecting circuit 46 becomes different for each timing of comparison, and the phase detection signal LD becomes a high level.

At a point of time when the phase detection signal LD has become a high level, the voltage control circuit 23 outputs an instruction signal for increasing the driving voltage Vcc to the driving voltage adjusting circuit 22. As a result, the driving voltage Vcc increases, and at a point of time when the driving voltage Vcc has reached a voltage V1 slightly higher than a voltage V2, the phase difference between the phase of the number of revolution command signal and the phase of the number of revolution detection signal becomes within a predetermined range of value. Accordingly, the phase detection signal LD output from the phase lock detecting circuit 63 changes from a high level to a low level, and the phase of the number of revolution detection signal is locked by the PLL control circuit 60, so that the motor can be controlled to rotate at a constant speed.

In the manner as described above, the driving voltage Vcc can be adjusted to a level in the vicinity of a PLL controllable minimum level and the optical scanning apparatus can carry out a normal or steady operation such as a printing operation.

Next, at the time when the normal operation mode is shifted to a predetermined low-speed operation mode such as the standby time or the resolution change-over time, a number of revolution N2 for the standby time lower than the number of revolution N1 for the normal operation is set to the number of revolution setting circuit 21 by an instruction signal of the voltage control circuit 23. A frequency dividing ratio corresponding to the number of revolution N2 is set to the frequency divider 61 by the number of revolution command output from the number of revolution setting circuit 21, and a number of revolution command signal of the frequency corresponding to the set number of revolution N2 is output to the phase comparator 62 from the frequency divider 61. The motor is driven based on this number of revolution command signal. This number of revolution decreases gradually from the set number of revolution N1 for the normal operation. At a point of time when a number of revolution of the motor detected by the number of revolution detecting circuit 46 has reached the number of revolution N2, the phase detection signal LD output from the phase lock detecting circuit 63 changes from a high level to a low level, and the phase of the number of revolution detection signal becomes in the locked state by the PLL control circuit 60. At this point of time, the driving voltage of the motor for driving the rotation polyhedral mirror of the optical deflector to rotate is V1 which is the same as that for the normal operation, and the rotation of the motor is controlled at a constant speed at the number of revolution N2.

The voltage control circuit 23 receives the phase detection signal LD, and at a point of time when this signal has become a low level, the voltage control circuit 23 outputs an instruction signal for reducing the driving voltage Vcc to the driving voltage adjusting circuit 22. As a result, the driving voltage Vcc is reduced gradually from the V1 level, and when the driving voltage Vcc has been reduced to the level where Vcc=V4, the motor becomes no more able to generate a torque for driving the rotation polyhedral mirror at the number of revolution N2, so that the phase locked state of the number of revolution detection signal is canceled and the PLL control can not be carried out. Accordingly, the number of revolution of the motor is lowered, the difference between the phase of the number of revolution command signal output from the frequency divider 61 and the phase of the number of revolution detection signal output from the number of revolution detecting circuit 46 becomes different for each timing of comparison, and the phase detection signal LD becomes a high level.

At a point of time when the phase detection signal LD has become a high level, the voltage control circuit or device 23 outputs an instruction signal for increasing the driving voltage Vcc to the driving voltage adjusting circuit 22. As a result, the driving voltage Vcc increases, and at a point of time when the driving voltage Vcc has reached a voltage V3 slightly higher than a voltage V4, the phase difference between the phase of the number of revolution command signal and the phase of the number of revolution detection signal becomes within a predetermined range of value. Accordingly, the phase detection signal LD output from the phase lock detecting circuit 63 changes from a high level to a low level, and the phase of the number of revolution detection signal is locked by the PLL control circuit 60, so that the motor can be controlled to rotate at a constant speed.

In the manner as described above, the driving voltage Vcc can be adjusted to a level in the vicinity of a PLL controllable minimum level and the optical scanning apparatus becomes in a predetermined low-speed operation mode such as for the standby time and the resolution change-over time.

According to the first embodiment of the present invention, it becomes possible to carry out a stable drive control of the motor in all operation modes in the vicinity of a controllable minimum driving current, so that it is possible to prevent a rotation failure due to variations of motors or an increase in power consumption.

Figure 4:
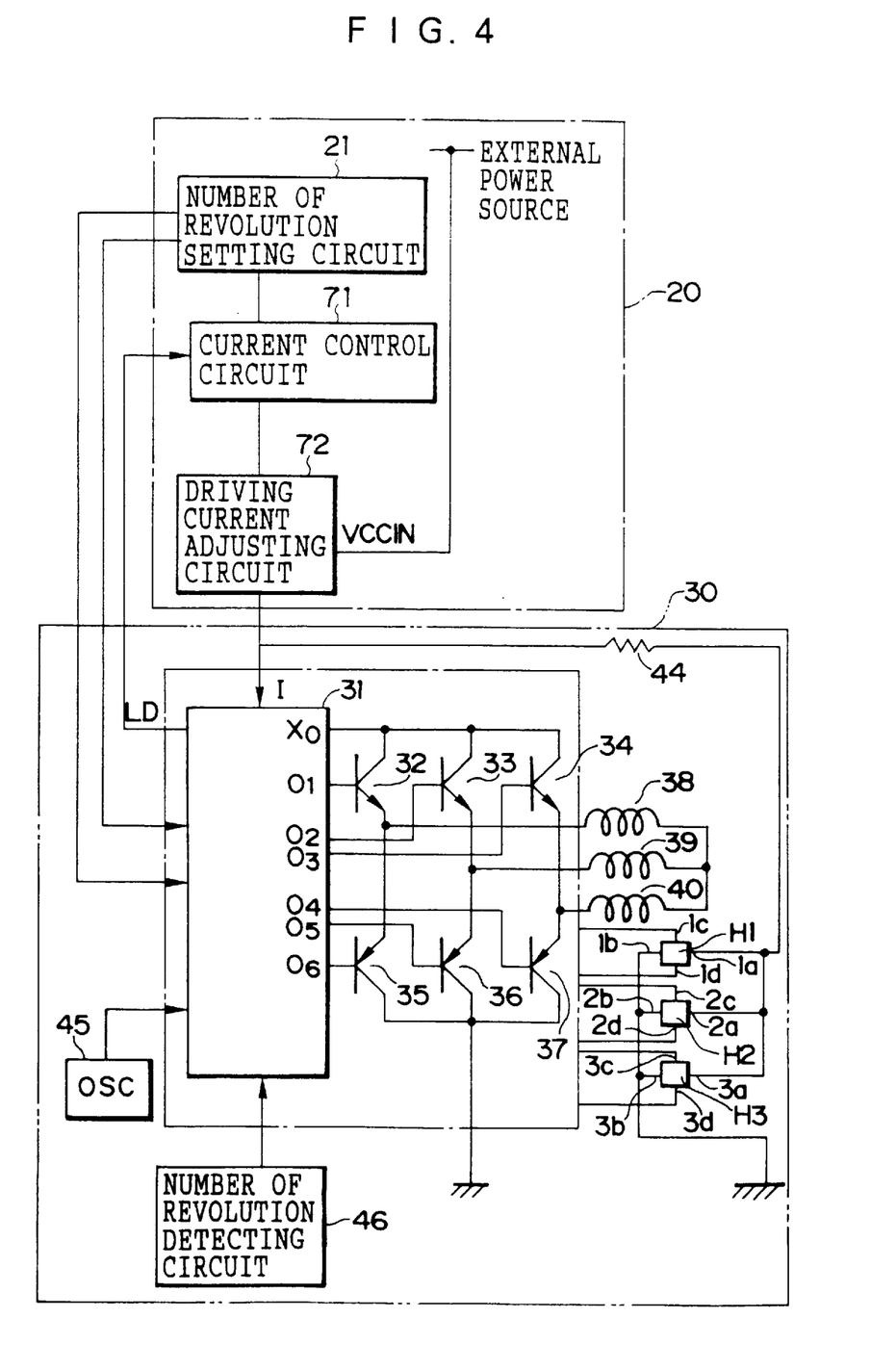
FIG. 4 is a block diagram for showing a configuration of a second embodiment of a rotation polyhedral mirror drive control apparatus for an optical scanning apparatus to which the present invention is applied.

FIG. 4 shows a configuration of the rotation polyhedral mirror drive control unit for an optical scanning apparatus relating to a second embodiment shown in FIG. 4, in the. As shown in FIG. 4, in the rotation polyhedral mirror drive control device relating to the second embodiment of the present invention, instead of a driving voltage to be supplied to the motor, a driving current is adjusted to a level in the vicinity of the PLL controllable minimum level to drive control the motor in all the operation modes. For this purpose, a current control circuit 71 is provided instead of the voltage control device 23, and a driving current adjusting circuit 72 is provided instead of the driving voltage adjusting circuit 22.

The driving current adjusting circuit 72 adjusts the level of the motor driving current to be supplied to the motor control circuit 31 of the motor circuit section 30 under the control of the current control circuit 71.

The current control circuit 71 instructs the number of revolution setting circuit 21 to change the set number of revolution so that the motor is driven to rotate at different number of revolution between the normal operation time or mode such as the printing time and the standby time or mode, for example. At the same time, the current control circuit 71 instructs the driving current adjusting circuit 72 to adjust the motor driving current at a level in the vicinity of the PLL controllable minimum level based on the phase detection signal output from the PLL control unit for showing whether the phase of the number of revolution detection signal of the driving motor is in the locked state or not.

Further, the driving current of the motor is supplied to the common connected collectors of the switching transistors 32, 33 and 34 from the terminal X0 of the motor control circuit 31.

The configuration of the second embodiment is the same as that of the first embodiment shown in FIG. 1 except the above-described structure, and the same reference numbers are attached to those same structural elements and their duplicated explanation will be omitted.

Figure 5:
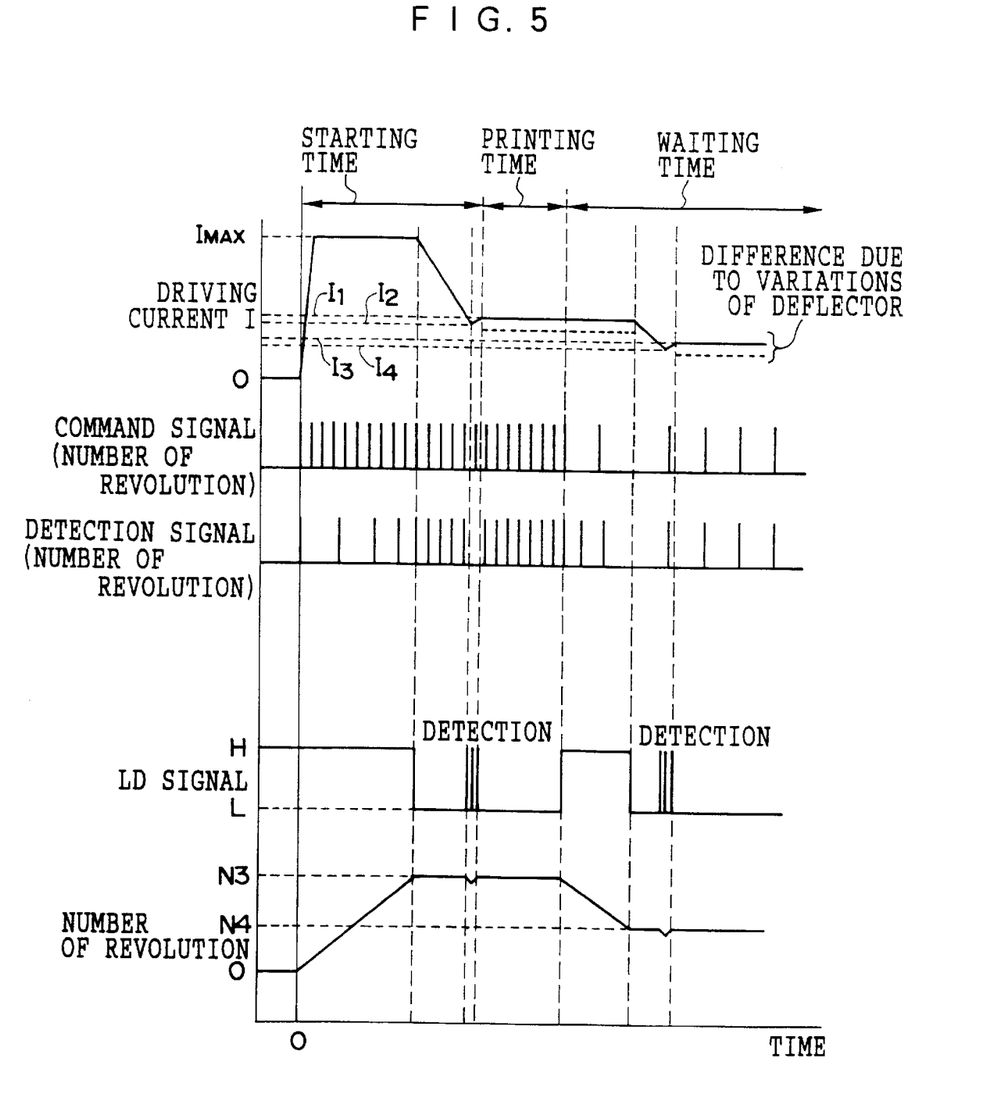
FIG. 5 is a time chart for explaining the operation of the rotation polyhedral mirror drive control device shown in FIG. 4.

Next, the operation of the rotation polyhedral mirror drive control device relating to the second embodiment of the present invention will be explained with reference to FIG. 5. At the time of starting the motor, the driving current adjusting circuit 72 supplies a current Imax of a maximum level of a driving current I to the motor control circuit 31 under the control of the current control circuit 71 in order to shorten the starting time of the motor. The motor control circuit 31 applies the current Imax to the common connected collectors of the switching transistors 32, 33 and 34 from the terminal X0.

On the other hand, a high number of revolution N3 is set to the number of revolution setting circuit 21 based on an instruction signal of the current control circuit 71, and a number of revolution command is output from the number of revolution setting circuit 21 to the frequency divider 61 of the motor control circuit 31. By this number of revolution command, the frequency dividing ratio of the frequency divider 61 is set according to the number of revolution N3, and the frequency of the oscillation output of the crystal oscillator 45 is divided. The number of revolution command output from the frequency divider 61 becomes a PWM signal through the phase comparator 62, the integrating circuit 64 and the comparator 51, and the PWM signal is supplied to each base of the switching transistors 32, 33, 34, 35, 36 and 37 from the terminals O1 to O6 of the motor control circuit 31 in a predetermined order based on the position information of the rotor of the motor obtained from the Hall elements H1, H2 and H3. As a result, the number of revolution of the motor increases, and the phase of the number of revolution command signal output from the frequency divider 61 and the phase of the number of revolution detection signal output from the number of revolution detecting circuit 46 are compared with each other by the phase comparator 62.

At a point of time when the phase difference has become within a predetermined range of value, that is, when the detected number of revolution of the motor has reached the number of revolution N3, the phase detection signal LD output from the phase lock detecting circuit 63 changes from a high level to a low level, and the phase of the number of revolution detection signal is locked by the PLL control circuit 60. At this time, the motor for driving the rotation polyhedral mirror of the optical deflector to rotate is set to a state of being controlled to rotate at a constant speed at the number of revolution N3 and at the driving current Imax.

The current control circuit 71 receives the phase detection signal LD, and at a point of time when this signal has become a low level, the current control circuit 71 outputs an instruction signal for reducing the driving current I to the driving current adjusting circuit 72. As a result, the driving current I is reduced gradually from the Imax level, and when the driving current I has been reduced to the level where I=I2, the motor becomes no more able to generate a torque for driving the rotation polyhedral mirror at the number of revolution N3, so that the phase locked state of the number of revolution detection signal is canceled and the PLL control can not be carried out. Accordingly, the number of revolution of the motor is lowered, the difference between the phase of the number of revolution command signal output from the frequency divider 61 and the phase of the number of revolution detection signal output from the number of revolution detecting circuit 46 becomes different for each timing of comparison, and the phase detection signal LD becomes a high level.

At a point of time when the phase detection signal LD has become a high level, the current control circuit 71 outputs an instruction signal for increasing the level of the driving current I to the driving current adjusting circuit 72. As a result, the driving current I increases, and at a point of time when the driving current I has reached a current I1 slightly higher than a current I2, the phase difference between the phase of the number of revolution command signal and the phase of the number of revolution detection signal becomes within a predetermined range of value. Accordingly, the phase detection signal LD output from the phase lock detecting circuit 63 changes from a high level to a low level, and the phase of the number of revolution detection signal is locked by the PLL control circuit 60, so that the motor can be controlled to rotate at a constant speed.

In the manner as described above, the driving current I can be adjusted to a level in the vicinity of a PLL controllable minimum level and the optical scanning apparatus can carry out a normal operation mode such as a printing operation.

Next, at the time when the normal operation mode is shifted to a predetermined low-speed operation mode such as the standby time or the resolution change-over time, a number of revolution N4 for the standby time lower than the number of revolution N3 for the normal operation mode is set to the number of revolution setting circuit 21 by an instruction signal of the current control circuit 71. A frequency dividing ratio corresponding to the number of revolution N4 is set to the frequency divider 61 by the number of revolution command output from the number of revolution setting circuit 21, and a number of revolution command signal of the frequency corresponding to the set number of revolution N4 is output to the phase comparator 62 from the frequency divider 61. The motor is driven based on this number of revolution command signal. This number of revolution decreases gradually from the set number of revolution N3 for the normal operation mode. At a point of time when a number of revolution of the motor detected by the number of revolution detecting circuit 46 has reached the number of revolution N4, the phase detection signal LD output from the phase lock detecting circuit 63 changes from a high level to a low level, and the phase of the number of revolution detection signal becomes in the locked state by the PLL control circuit 60. At this point of time, the driving current of the motor for driving the rotation polyhedral mirror of the optical deflector to rotate is I1 which is the same as that for the normal operation mode, and the rotation of the motor is controlled at a constant speed and at the number of revolution N4.

The current control circuit 23 receives the phase detection signal LD, and at a point of time when this signal has become a low level, the current control circuit 23 outputs an instruction signal for reducing the driving current I to the driving current adjusting circuit 72. As a result, the driving current I is reduced gradually from the I1 level, and when the driving current I has been reduced to the level where I=I4, the motor becomes no more able to generate a torque for driving the rotation polyhedral mirror at the number of revolution N4, so that the phase locked state of the number of revolution detection signal is canceled and the PLL control can not be carried out. Accordingly, the number of revolution of the motor is lowered, the difference between the phase of the number of revolution command signal output from the frequency divider 61 and the phase of the number of revolution detection signal output from the number of revolution detecting circuit 46 becomes different for each timing of comparison, and the phase detection signal LD becomes a high level.

At a point of time when the phase detection signal LD has become a high level, the current control circuit 71 outputs an instruction signal for increasing the driving current I to the driving current adjusting circuit 22. As a result, the driving current I increases, and at a point of time when the driving current I has reached a current I3 slightly higher than a current I4, the phase difference between the phase of the number of revolution command signal and the phase of the number of revolution detection signal becomes within a predetermined range of value. Accordingly, the phase detection signal LD output from the phase lock detecting circuit 63 changes from a high level to a low level, and the phase of the number of revolution detection signal is locked by the PLL control circuit 60, so that the motor can be controlled to rotate at a constant speed.

In the manner as described above, the driving current I can be adjusted to a level in the vicinity of a PLL controllable minimum level and the optical scanning apparatus becomes in a predetermined low-speed operation mode such as for the standby time and the resolution change-over time.

According to the second embodiment of the present invention, it becomes possible to carry out a stable drive control of the motor in all operation modes in the vicinity of a controllable minimum driving current, so that it is possible to prevent a rotation failure due to variations of motors or an increase in power consumption.

Although description has been made of the case in the first and second embodiments of the present invention where the invention is applied to the rotation polyhedral mirror drive control device for the optical scanning apparatus, the present invention is not limited to this. For example, it is also possible to apply the present invention to other apparatuses such as the cooling fan, the fixing unit or the like in which the motor power source is kept being turned on during a normal operation mode such as the printing time or mode and during a predetermined low-speed operation mode such as the standby time or mode or resolution change-over time.

What is claimed is:

1. A motor drive control apparatus, comprising:

number of revolution setting means for outputting a number of revolution command signal for setting a number of revolution of a motor;

driving means for driving said motor to rotate at a predetermined number of revolution based on the number of revolution command signal output from said number of revolution setting means;

number of revolution detecting means for detecting a number of revolution of said motor;

driving voltage adjusting means for adjusting a level of a driving voltage of said motor supplied to said driving means;

PLL control means for comparing a phase of a number of revolution command signal output from said number of revolution setting means with a phase of a number of revolution detection signal output from said number of revolution detecting means and for controlling the number of revolution of said motor so that the difference between both phases falls within a predetermined range of value; and voltage control means for instructing said driving voltage adjusting means to adjust the driving voltage of said motor at a value in the vicinity of a minimum level at which the PLL control can be carried out.

2. A motor drive control apparatus according to claim 1, wherein said voltage control means is so structured to instruct said driving voltage adjusting means that the driving voltage of said motor is increased at the time of starting said motor, that the driving voltage is reduced at a point of time when a difference between the phase of a number of revolution command signal output from said number of revolution setting means and the phase of a number of revolution detection signal output from said number of revolution detecting means has fallen within the predetermined range of value, that the driving voltage is increased gradually at a point of time when a difference between the phase of a number of revolution command signal output from said number of revolution setting means and the phase of a number of revolution detection signal output from said number of revolution detecting means has exceeded the predetermined range of value and a phase locked state has been canceled, and that the level of the driving voltage is maintained at a point of time when the difference between both phases has fallen within the predetermined range of value again and the phases have been in a locked state.

3. A motor drive control unit according to claim 1, wherein said voltage control means is so structured to instruct said driving voltage adjusting means that, at the time when said motor shifts its operation from the normal operation mode to a predetermined low-speed operation mode, the driving voltage of said motor is reduced from a level the normal operation mode at a point of time when the number of revolution of said motor has reached a preset number of revolution of the predetermined low-speed operation, that the driving voltage is increased gradually at a point of time when a difference between the phase of a number of revolution command signal output from said number of revolution setting means and the phase of a number of revolution detection signal output from said number of revolution detecting means has exceeded the predetermined range of value and a phase locked state has been canceled, and that the level of the driving voltage is maintained at a point of time when the difference between both phases has fallen within the predetermined range of value and the phases have been in a locked state.

4. A motor drive control apparatus, comprising:

number of revolution setting means for outputting a number of revolution command signal for setting a number of revolution of a motor;

driving means for driving said motor to rotate at a predetermined number of revolution based on a number of revolution command signal output from said number of revolution setting means;

number of revolution detecting means for detecting a number of revolution of said motor;

driving current adjusting means for adjusting a level of a driving current of said motor supplied to said driving means;

PLL control means for comparing a phase of a number of revolution command signal output from said number of revolution setting means with a phase of a number of revolution detection signal output from said number of revolution detecting means and for controlling the number of revolution of said motor so that the difference between both phases falls within a predetermined range of value; and current control means for instructing said driving current adjusting means to adjust the driving current of said motor at a value in the vicinity of a minimum level at which the PLL control can be carried out.

5. A motor drive control apparatus according to claim 4, wherein said current control means is so structured to instruct said driving current adjusting means that the driving current of said motor is increased at the time of starting said motor, that the driving current is reduced at a point of time when a difference between the phase of a number of revolution command signal output from said number of revolution setting means and the phase of a number of revolution detection signal output from said number of revolution detecting means has fallen within the predetermined range of value, that the driving current is increased gradually at a point of time when a difference between the phase of a number of revolution command signal output from said number of revolution setting means and the phase of a number of revolution detection signal output from said number of revolution detecting means has exceeded the predetermined value and a phase locked state has been canceled, and that the level of the driving current is maintained at a point of time when the difference between both phases has fallen within the predetermined range of value again and the phases have been in a locked state.

6. A motor drive control apparatus according to claim 4, wherein said current control means is so structured to instruct said driving current adjusting means that, at the time when said motor shifts its operation from the normal operation mode to a predetermined low-speed operation mode, the driving current of said motor is reduced from the level of the normal operation at a point of time when the number of revolution of said motor has reached a preset number of revolution of the predetermined low-speed operation, that the driving current is increased gradually at a point of time when a difference between the phase of a number of revolution command signal output from said number of revolution setting means and the phase of a number of revolution detection signal output from said number of revolution detecting means has exceeded the predetermined value and a phase locked state has been canceled, and that the level of the driving current is maintained at a point of time when the difference between both phases has fallen within the predetermined range of value and the phases have been in a locked state.

* * * * *